No. 622,805. Patented Apr. 11, 1899.
H. F. HOWARD.
FEED WATER PURIFIER AND HEATER FOR STEAM BOILERS.
(Application filed Apr. 15, 1898.)
(No Model.) 2 Sheets—Sheet 1.

WITNESSES
INVENTOR
Harley F. Howard,
BY
Edgar Tate & Co.
ATTORNEYS

THE NORRIS PETERS CO., PHOTO-LITHO., WASHINGTON, D. C.

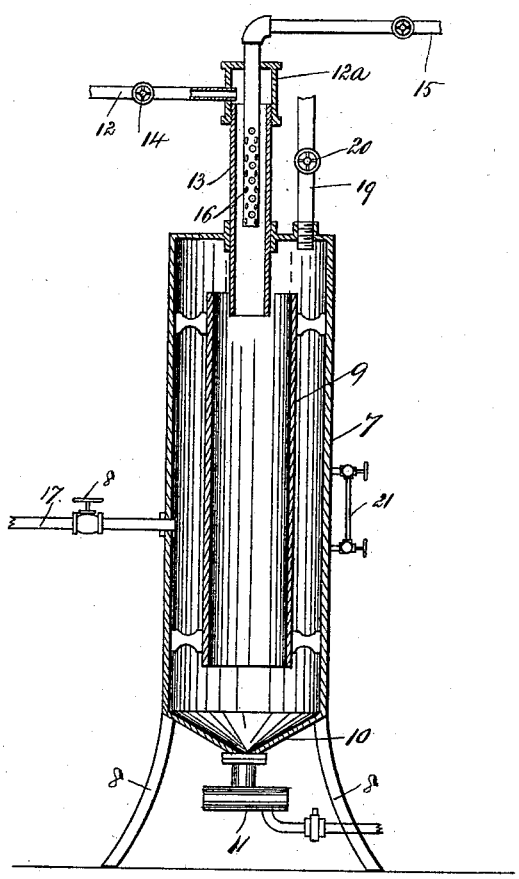

UNITED STATES PATENT OFFICE.

HARLEY FAYETTE HOWARD, OF CRIPPLE CREEK, COLORADO.

FEED-WATER PURIFIER AND HEATER FOR STEAM-BOILERS.

SPECIFICATION forming part of Letters Patent No. 622,805, dated April 11, 1899.

Application filed April 15, 1898. Serial No. 677,692. (No model.)

*To all whom it may concern:*

Be it known that I, HARLEY FAYETTE HOWARD, a citizen of the United States, residing at Cripple Creek, in the county of El Paso and State of Colorado, have invented certain new and useful Improvements in Feed-Water Purifiers and Heaters for Steam-Boilers, of which the following is a full and complete specification, such as will enable those skilled in the art to which it appertains to make and use the same.

This invention relates to feed-water purifiers and heaters for steam-boilers; and the object thereof is to provide a simple and effective device of this class by means of which the feed-water for a boiler is not only heated and introduced into the boiler at the required temperature, but is also purified, and all sediment and other impurities removed therefrom.

The invention is fully disclosed in the following specification, of which the accompanying drawings form a part, in which the separate parts of my improvement are designated by the same numerals of reference in each of the views, and in which—

Figure 1:
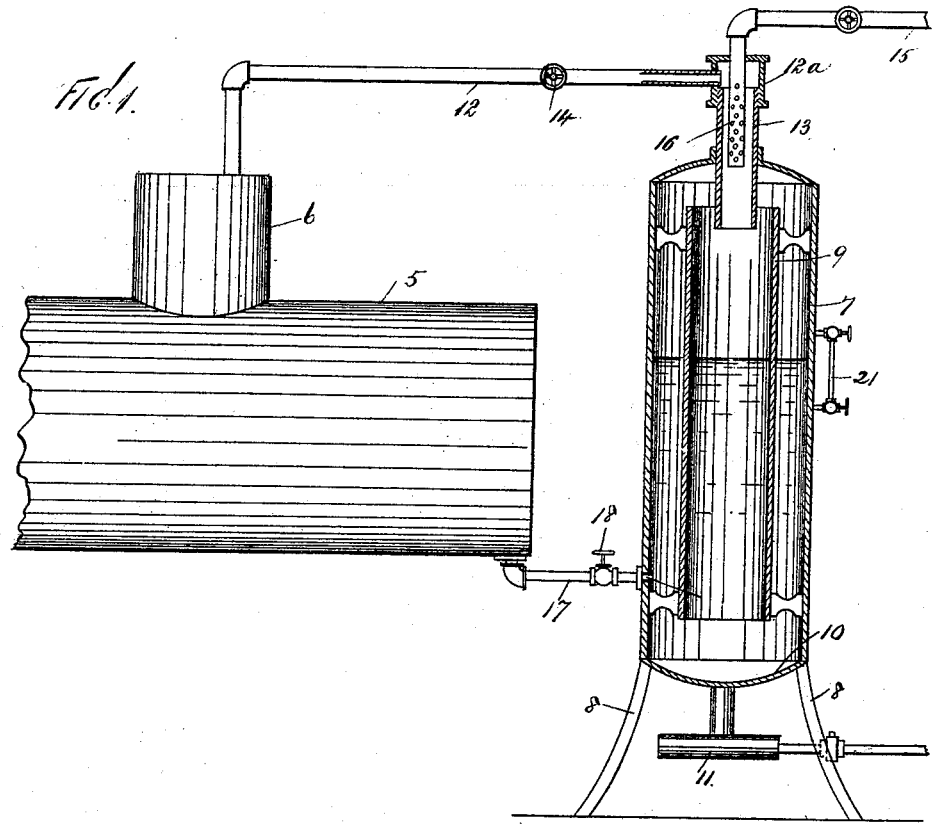
Figure 2:
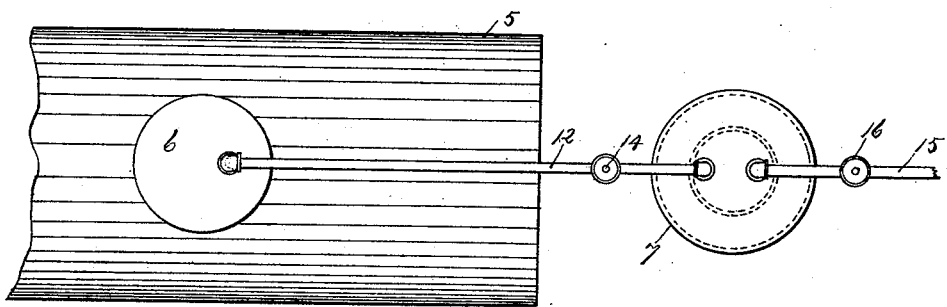

Figure 1 is a side view of a portion of a steam-boiler, showing my improved feed-water purifier and heater connected therewith, the latter being shown in section. Fig. 2 is a plan view thereof, and Fig. 3 is a sectional view of a modified form of the water purifier and heater.

In the drawings forming part of this specification I have shown at 5 a part of an ordinary steam-boiler which is provided with the usual steam-drum 6, and in the practice of my invention I provide a feed-water purifier and heater consisting of a vertical cylindrical casing 7, which is supported by legs 8 or in any other desired manner.

The casing 7 may be constructed in any desired manner and in practice is made of sufficient strength to retain a pressure equal to or substantially equal to that within the boiler, and the said casing 7 is closed at both ends, and placed therein is a supplemental tubular casing 9, which is open at both ends and which is supported within the casing 7 in any desired manner.

The bottom of the casing 7 of the feed-water purifier and heater is preferably slightly depressed, as shown at 10, and communicating with the bottom thereof is an exhaust and blow-off 11, which may be of any desired form or construction.

Communicating with the steam-drum 6 of the boiler is a steam-pipe 12, or this pipe may communicate with the steam-exhaust of the engine, and said pipe also communicates with the upper end of the feed-water purifier and heater by means of a tube 13, which is set into the upper end of the casing 7 and projects downwardly into the open upper end of the inner supplemental tubular casing 9, said tube 13 being provided at its upper end with a tubular cap $12^a$, which is secured thereto and with which the tube 12 communicates, and this steam-pipe 12 is provided with a valve 14, and a feed-water pipe 15 passes through the upper end of the tubular cap $12^a$ of the tube 13 and projects downwardly into said tube, and the lower end thereof is perforated, as shown at 16.

A water-pipe 17 forms a communication between the bottom of the boiler, preferably near one end thereof, and the feed-water purifier and heater, above the bottom thereof, and is provided with a valve 18, and the operation of this form of construction will be readily understood from the foregoing description when taken in connection with the accompanying drawings and the following statement thereof.

The feed-water enters through the pipe 15 and is discharged into the inner supplemental casing 9, and the steam from the boiler passes into the outer casing 7 through the pipes 12 and 13. The feed-water is at once heated to a high degree, and all sediment and impurities are separated therefrom and pass into the bottom of the casing 7 and into the blow-off 11, from which said impurities may be removed whenever desired, and the purified water, which has also been heated, passes through the pipe 17 into the boiler, and this device is simple in construction and operation and perfectly adapted to accomplish the result for which it is intended and is also comparatively inexpensive.

The perforated end 16 of the pipe 15 may be detached from said pipe whenever desired and cleaned, and the perforations 16 in said end of said pipe are intended to prevent scale or other large substances from passing into the purifier and heater.

The form of construction shown in Fig. 3 is substantially the same as that shown in Fig. 1, with the exception that the feed-water purifier and heater is provided with an air-pipe 19, which is intended to form a communication with the outer air and which is provided with a valve 20, which may be automatic in its operation, if desired. I also in practice provide a water-gage 21, as shown in Fig. 1, by means of which the amount of the water in the purifier and heater may be made known, and a similar device, as will be understood, may be applied to the form of construction shown in Fig. 3.

It will be apparent that changes in and modifications of the construction herein described may be made without departing from the spirit of my invention or sacrificing its advantages, and I reserve the right to make all such alterations therein as fairly come within the scope of the invention.

Having fully described my invention, I claim as new and desire to secure by Letters Patent—

The combination with a steam-boiler, of a feed-water purifier and heater comprising an outer and inner vertical casing, said outer casing being closed at the top and bottom and said inner casing being open and in communication with the interior of said outer casing at top and bottom, a pipe furnishing means of communication between said outer casing and said boiler approximately at the bottom of said casing, a main pipe which extends through the closed upper end of the outer casing and into the open upper end of the inner casing, a feed-water-supply pipe which also extends into the upper end of said main pipe, a detachable perforated extension of said feed-water-supply pipe and which extends downwardly into said main pipe, a steam-pipe which communicates with the steam-drum of the boiler and with the main pipe, a blow-off pipe at the bottom of said outer casing, a valve in said blow-off pipe, a valve in said pipe at the bottom of the boiler, a valve in said feed-water-supply pipe, and a valve in said steam-pipe, substantially as shown and described.

In testimony that I claim the foregoing as my invention I have signed my name, in presence of the subscribing witnesses, this 11th day of April, 1898.

HARLEY FAYETTE HOWARD.

Witnesses:
ERNEST H. FARRAR,
FRED W. MCCULLOCH.